(12) United States Patent
Cardon

(10) Patent No.: US 9,731,899 B1
(45) Date of Patent: Aug. 15, 2017

(54) DYNAMIC GUIDES FOR FLEXIBLE TRACKS

(71) Applicant: The Boeing Company, Chicago, IL (US)

(72) Inventor: Lisa Ann Cardon, Lake Tapps, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/193,961

(22) Filed: Jun. 27, 2016

(51) Int. Cl.
*B65G 21/14* (2006.01)
*B65G 21/12* (2006.01)

(52) U.S. Cl.
CPC ............ *B65G 21/12* (2013.01); *B65G 21/14* (2013.01)

(58) Field of Classification Search
CPC ......... B65G 21/12; B65G 21/14; B65G 13/12
USPC ... 198/861.2, 861.1, 678.1, 687.1, 831, 812, 198/584, 594, 595
See application file for complete search history.

(56) References Cited

U.S. PATENT DOCUMENTS

| | | | | | |
|---|---|---|---|---|---|
| 3,796,296 | A * | 3/1974 | Bakker | ................. | B65G 21/14 193/17 |
| 3,910,404 | A * | 10/1975 | Henrekson | ........... | B65G 17/385 198/712 |
| 4,489,826 | A * | 12/1984 | Dubson | ................ | B25J 17/0266 198/812 |
| 5,188,035 | A * | 2/1993 | Hideyuki | ................ | E01B 25/24 198/861.2 |
| 7,275,638 | B2 * | 10/2007 | Rundqvist | ............ | B65G 17/086 198/839 |
| 7,347,321 | B1 * | 3/2008 | Sakai | ..................... | B65G 9/008 198/678.1 |
| 7,398,872 | B2 * | 7/2008 | Valterio | .................... | B31B 1/00 198/626.3 |
| 7,506,589 | B2 * | 3/2009 | Hjort | .................... | A61G 7/1015 104/126 |
| 7,798,309 | B2 * | 9/2010 | Rice | ...................... | B24B 37/345 198/465.4 |
| 2010/0213037 | A1 * | 8/2010 | Avery | ................... | B65G 15/62 198/861.2 |

(Continued)

OTHER PUBLICATIONS

Mechanical Reels, Versatile Spring Assemblies, Vulcan Spring; http://www.vulcanspring.com/mechanical-reel; May 25, 2016.

*Primary Examiner* — James R Bidwell
(74) *Attorney, Agent, or Firm* — Duft Bornsen & Fettig LLP

(57) ABSTRACT

Systems and methods are provided for controlling flexible tracks. One embodiment is a system for conveying plies of laminate to a forming device. The system includes a flexible track assembly comprising a first portion of track and a second portion of track, each of the portions defining a groove dimensioned to receive a slider that transports a ply, the second portion arranged to transport the ply into the forming device. The track assembly also includes a guide in which ends of the portions are disposed. The system further includes a retraction line that applies a contracting force that biases the end of the second portion towards contact with the end of the first portion, the retraction line being extendable to enable the second portion to separate from the first portion, thereby accommodating extension of the track assembly in response to forces applied by the forming device during forming.

20 Claims, 12 Drawing Sheets

(56) References Cited

U.S. PATENT DOCUMENTS

2014/0326580 A1* 11/2014 Carpenter .............. B65G 21/14
198/571

* cited by examiner

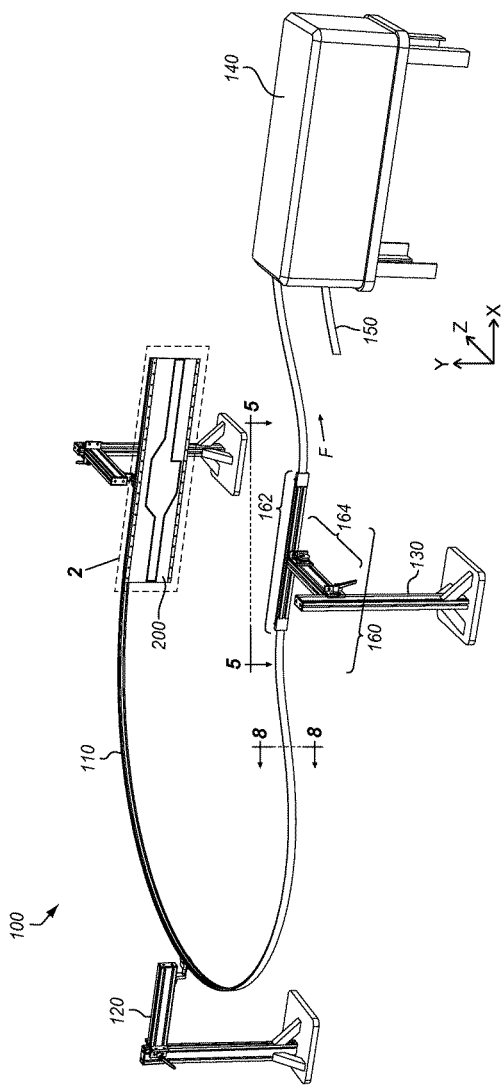

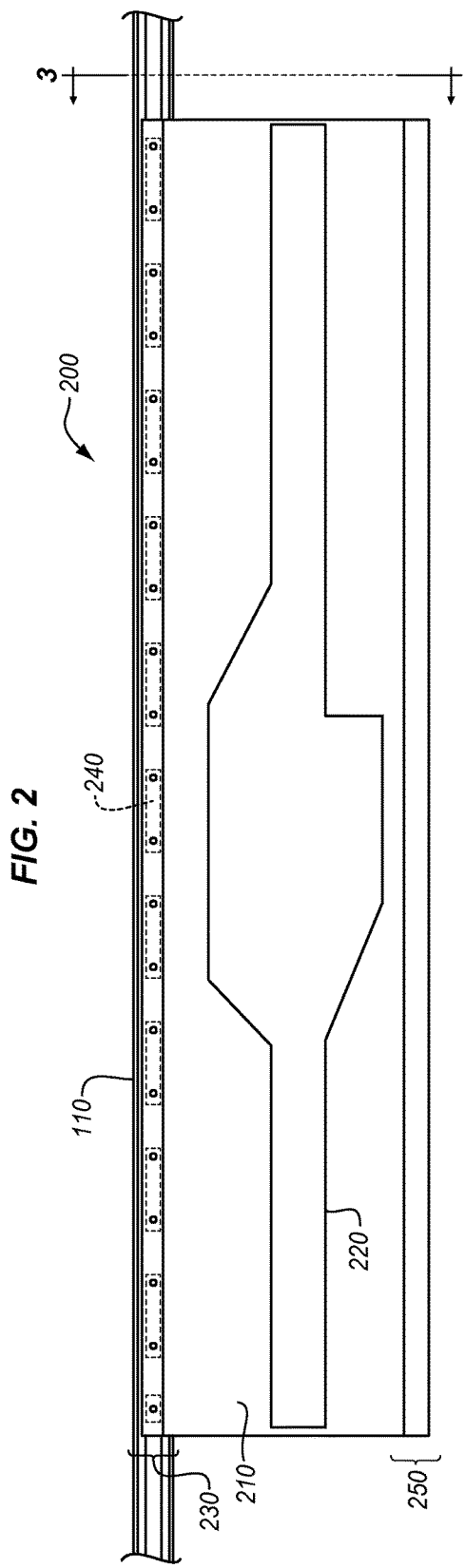
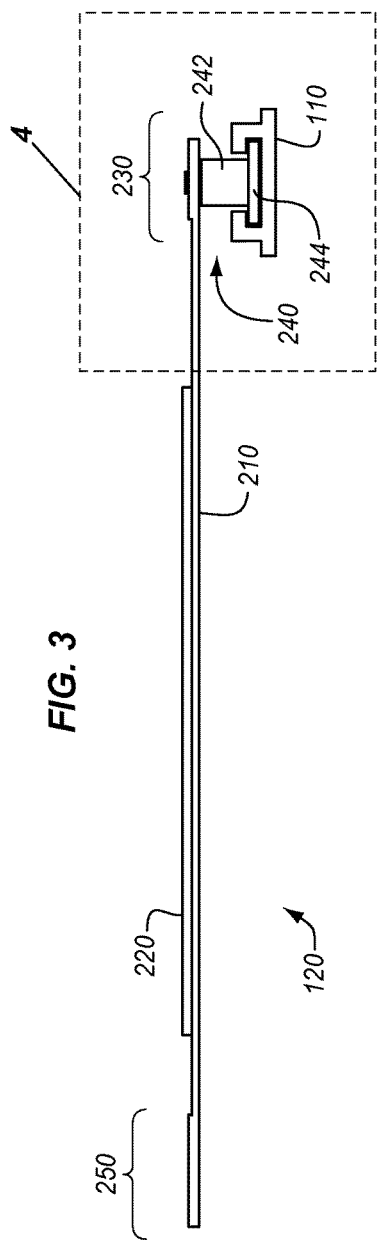

DYNAMIC GUIDES FOR FLEXIBLE TRACKS

FIELD

The disclosure relates to the field of fabrication, and in particular, to forming curable composite materials.

BACKGROUND

The fabrication of cured composite parts remains an involved process. Layers of constituent material (e.g., Carbon Fiber Reinforced Polymer (CFRP)) for a part may be laid-up one after another onto a surface and formed into a laminate having a complex shape. The laminate may then be cured (e.g., via the application of heat) into a unified, integral composite part having enhanced structural properties. Forming a laminate into a complex desired shape is particularly complicated, as this involves applying forces to the laminate from a variety of angles to apply stress to the laminate while also preventing the laminate from tearing.

Because the processes involved in forming a laminate are complex and time-consuming, it remains desirable to enhance the speed and efficiency with which laminates are formed and prepared for forming. Thus, operators of forming devices continue to seek out enhanced systems and techniques for performing the forming process efficiently.

SUMMARY

Embodiments described herein enhance tracks used for delivering laminates of constituent material to a forming device. Specifically, embodiments described herein utilize the insight that a forming device will apply forces to the track when forming the laminate into a desired shape, and implement systems that enable the track to deflect, reposition, rotate, pivot, and/or extend in response to forces applied by the forming device. When the forming device has completed forming of a laminate into a desired shape, the systems described herein may return the track to a resting position that the track occupied before the forming device began forming. This enables another slider of laminate to be efficiently delivered to the forming device. The features described herein also may facilitate the process of manually moving a laminate towards/into a forming device, by ensuring that the track may be deflected and/or extended without substantial effort by a user.

One embodiment is a system for conveying plies of laminate to a forming device. The system includes a flexible track assembly comprising a first portion of track and a second portion of track, each of the portions defining a groove dimensioned to receive a slider that transports a ply, the second portion arranged to transport the ply into the forming device. The track assembly also includes a guide in which an end of the first portion and an end of the second portion are disposed. The system further includes a retraction line that applies a contracting force that biases the end of the second portion towards contact with the end of the first portion, the retraction line being extendable to enable the second portion to separate from the first portion by sliding within the guide, thereby accommodating extension of the track assembly in response to forces applied by the forming device during forming.

Another embodiment is a method for controlling a position of a flexible track assembly that conveys plies of laminate to a forming device. The method includes positioning an end of a first portion of track and an end of a second portion of track within a guide, applying a contracting force via a retraction line that biases the end of the first portion towards contact with the end of the second portion and extending the retraction line in response to the contracting force being overcome by another force applied by the forming device during forming, causing the end of the second portion to separate from the end of the first portion and slide within the guide. The method further includes retracting the retraction line, thereby drawing the second portion towards the first portion in response to the other force terminating.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 1 is a diagram of a laminate delivery system for transporting laminates to a forming device in an exemplary embodiment.

FIGS. 2-4 are diagrams of a slider mounted to a track assembly of a laminate delivery system in an exemplary embodiment.

DESCRIPTION

Figure 4:
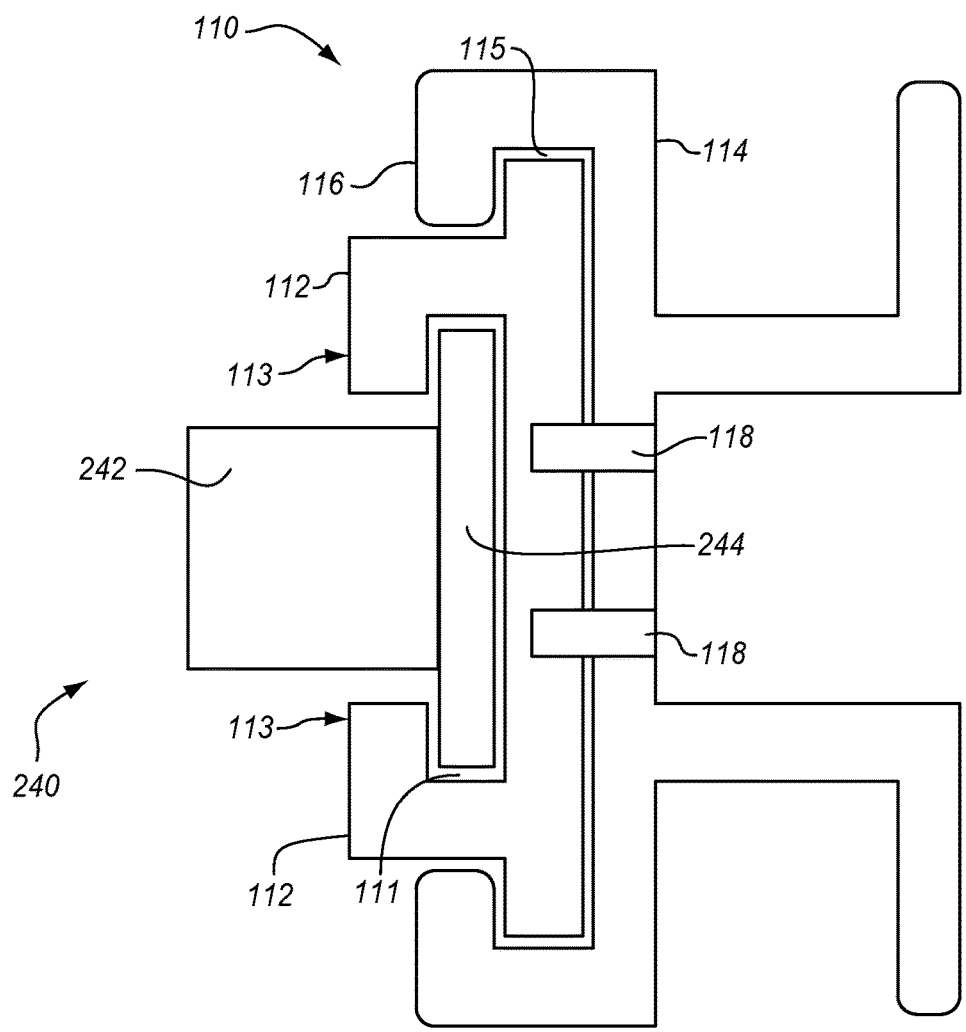

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

FIG. 1 is a diagram of a laminate delivery system 100 for transporting laminates to forming device 140 in an exemplary embodiment. According to FIG. 1, forming device 140 dynamically operates upon a laminate borne by slider 200 in order to form the laminate into a desired shape for curing. Track assembly 110 is utilized to deliver/convey slider 200 to forming device 140. In this embodiment, track assembly 110 is a flexible structure comprising a material capable of bending and/or elastically deflecting in response to forces applied by forming device 140. For example, while operating upon a laminate at slider 200, forming device 140 may apply forces to track assembly 110 that result in deformation of track assembly 110. If track assembly 110 remains bound in place while forming device 140 operates, track assembly 110 may experience stress and strain that results in degradation and/or failure. Conversely, if track assembly 110 is not adequately supported, the lack of rigidity in track assembly 110 will make it more difficult to transport slider 200 along track assembly 110 towards forming device 140.

In order to ensure that track assembly 110 is held in position to allow slider 200 to slide easily towards forming device 140, and in order to also enable track assembly 110 to deflect and/or extend in accordance with the operations of forming device 140, retractor system 160 (comprising retractors 162 and 164) is utilized. Retractor system 160 enhances the ability of track assembly 110 (and/or components thereof) to dynamically extend/deflect in response to forces applied by forming device 140, and without damaging track assembly 110. When forces applied by forming device 140 stop, retractors 162 and 164 return track assembly 110 to a desired default position. Thus, track assembly 110 maintains a desired shape for transporting slider 200, but also moves in accordance with forming device 140.

In this embodiment, track assembly 110 is fixedly attached to support 120, while retractors 162 and 164 are located proximate to support 130. An additional track assembly 150 is included proximate to forming device 140 to ensure adequate support of slider 200 as slider 200 travels towards forming device 140. However, any suitable combination of supports, retractors, and/or track assemblies may be utilized in order to convey a laminate to forming device 140 in a desired manner (e.g., in order to conform with the arrangement of machinery on a factory floor).

FIGS. 2-4 are diagrams of a slider 200 mounted to a track assembly 110 of a laminate delivery system 100 in an exemplary embodiment. In particular, FIG. 2 is a view of section 2 of FIG. 1, FIG. 3 is a diagram illustrated by view arrows 3 of FIG. 2, and FIG. 4 is a view of section 4 of FIG. 3. Slider 200 travels across track assembly 110 from an initial starting point shown in FIG. 1 towards forming device 140 in order to deliver a ply of laminate for forming. In this embodiment, slider 200 includes flexible substrate 210 (e.g., a fabric, such as a woven combination of rubber and thread) and laminate 220 (e.g., uncured CFRP) which is attached to fabric 210. Laminate 220 may comprise any suitable shape capable of coupling with substrate 210 and being formed by forming device 140. Laminate 220 will be formed by forming device 140, and then cured into a composite part utilized for example as a component of an aircraft. Slider 200 further includes region 230 which include mating features 240. As shown in FIG. 3, each mating feature 240 includes one or more projecting elements 242, and securement element 244 which sits secured within a groove defined by track assembly 110, and is dimensioned to slide within the groove. Slider 200 also includes region 250, which may for example comprise a continuous extrusion for insertion into additional track assembly 150.

FIG. 4 illustrates a further detailed view of a mating feature 240 mated with track assembly 110. Specifically, FIG. 4 illustrates that track assembly 110 includes a segment of track 112, and also includes a guide/backbone 114. Track 112 defines groove 111 through which mating features 240 slide, and further includes projections 112 and flanges 113. Meanwhile, guide 114 includes flanges 116, which define groove 115 through which track 112 may slide. That is, individual segments of track 112 may be slidably mated (i.e., slip fit) with guide 114, or may be fixedly attached to guide 114 as desired. In embodiments where track 112 is fixedly attached to guide 114, fixation elements 118 (e.g., screws, bolts, rivets, glue, etc.) may be utilized to affix track 112 to guide 114.

Figure 5:
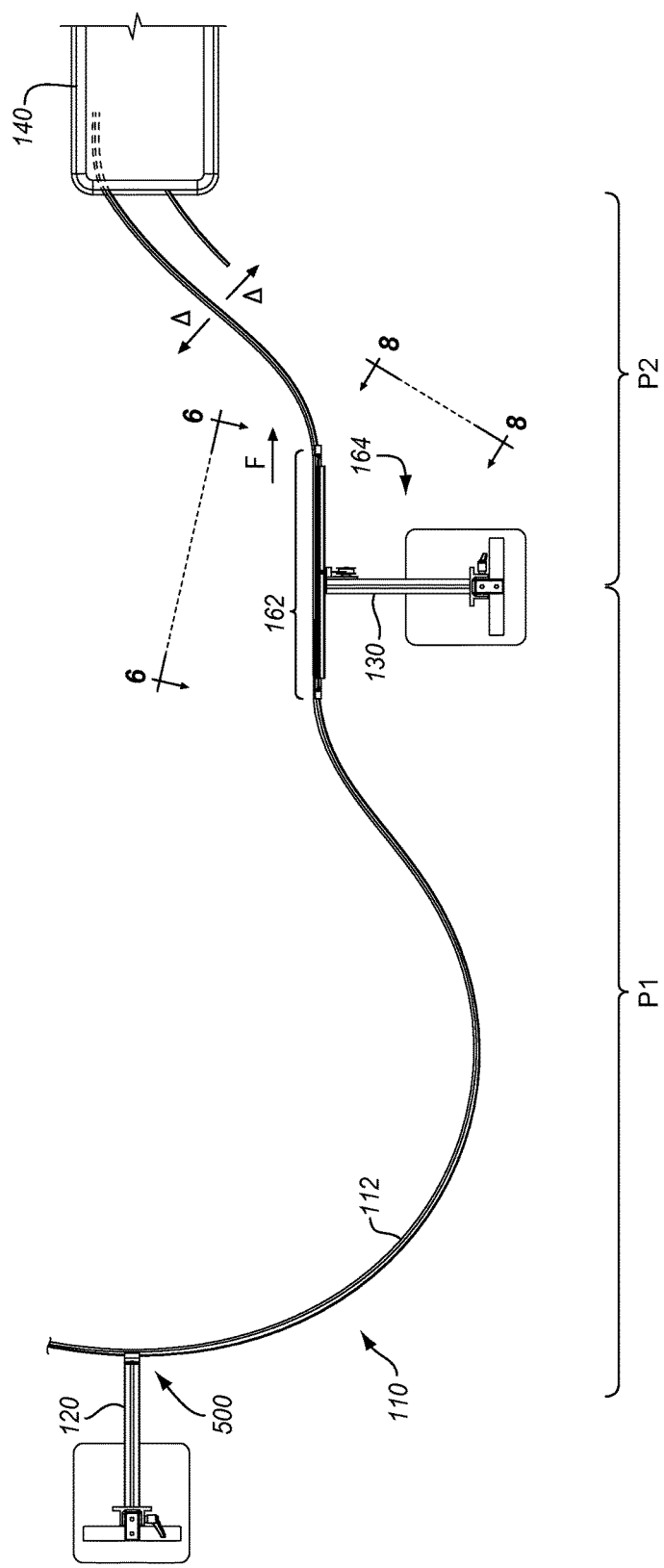
FIG. 5 is a diagram illustrating systems that enable dynamic and temporary deflection and extension of a track of a laminate delivery system in an exemplary embodiment.

With the structure of track assembly 110 and slider 200 now understood, the arrangement of track assembly 110 with respect to forming device 140 will now be discussed. FIG. 5 is a diagram illustrating systems that enable dynamic and temporary deflection and extension of a track of a laminate delivery system in an exemplary embodiment. FIG. 5 is a top-down view indicated by view arrows 5 of FIG. 1. As shown in FIG. 5, track assembly 110 includes a first portion of track 112 (P1), and a second portion of track 112 (P2). The first portion of track 112 may be fixed to a corresponding portion of guide 114, while the second portion of track 112 may be slidably supported by guide 114. In this manner, when forming device 140 applies forces to track assembly 110 during forming, portion P2 may travel (e.g., in a direction corresponding to force F) with respect to portion P1. As shown in FIG. 5, portion P1 may be fixedly attached to support 120 at location 500 (e.g., via fixed attachment to guide 114, which itself is fixed to support 120). Meanwhile, portion P2 may be movably attached to support 130, which enables portion P2 to deflect/translate by some amount A in response to forces applied by forming device 140. The ability to move portion P2 is also advantageous because it reduces the amount of effort required for a user to convey slider 200 along P2 to forming device 140.

Figure 6:
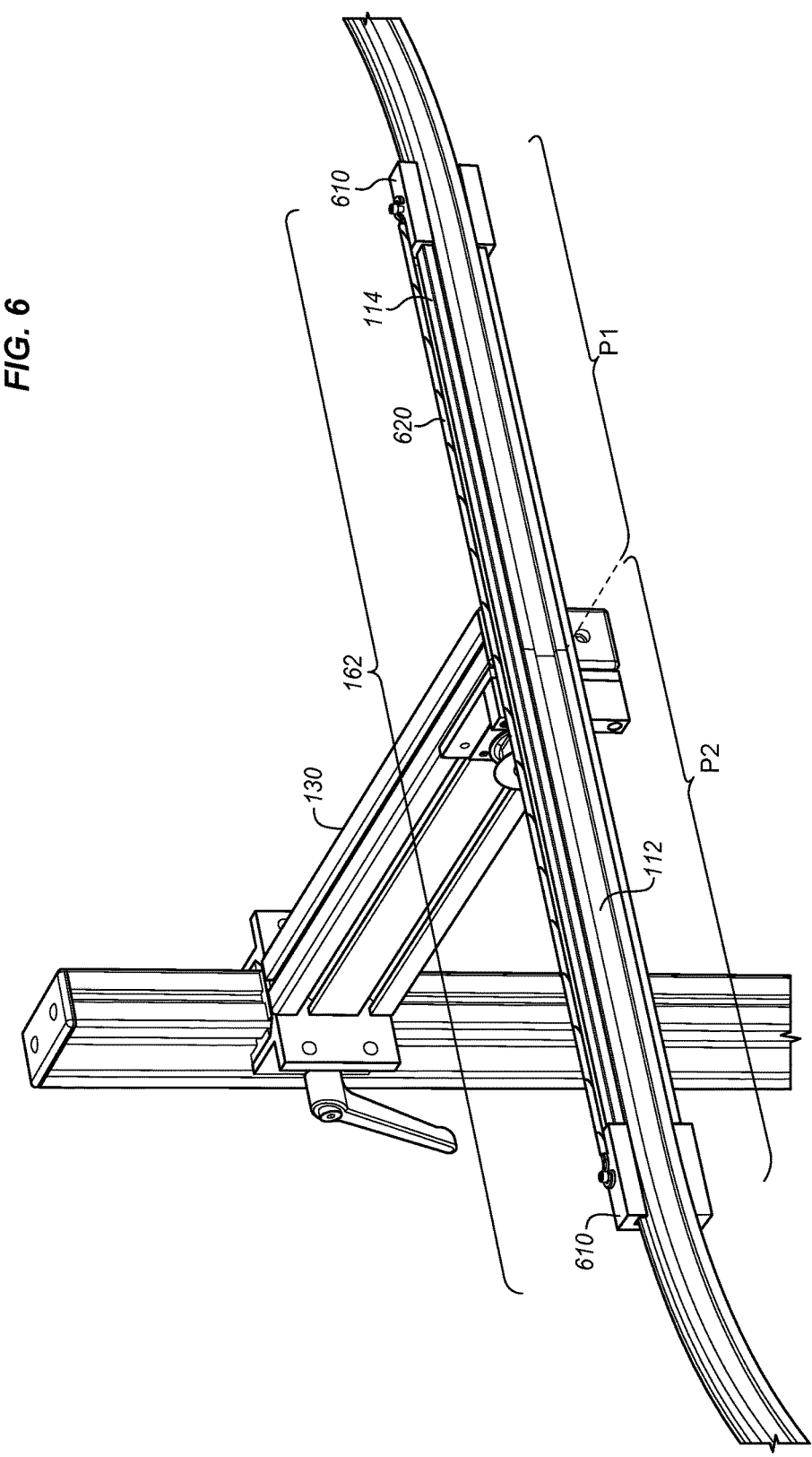
FIGS. 6-7 are diagrams illustrating extension of a track of a laminate delivery system in an exemplary embodiment.
Figure 7:
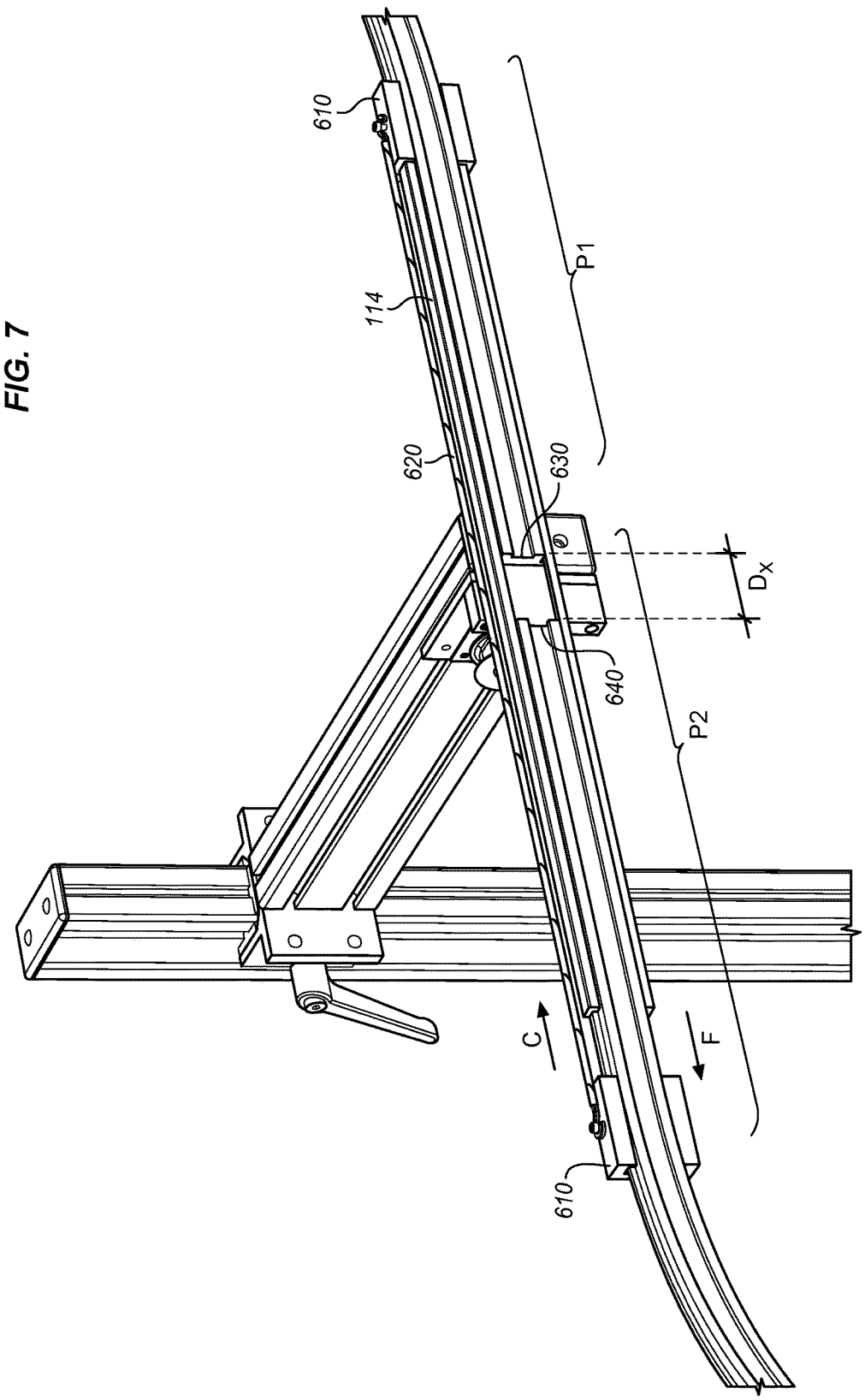

FIG. 5 further illustrates retractors 162 and 164, which together enable portion P2 to return to a desired default position (e.g., in contact with support 130) after forming device 140 stops applying forces to portion P2. FIGS. 6-7 are diagrams illustrating extension and retraction of a track 112 of a laminate delivery system 100 in an exemplary embodiment. As shown in FIG. 6, support 610 (e.g., a clamp) is fixedly attached to a segment of track 112 at portion P1, while another support 610 is fixedly attached to guide 114 aligned with portion P2 of track 112. Retraction line 620 is attached to each of supports 610. Segments of track 112 at portion P1 are fixedly attached to guide 114, while segments of track 112 at portion P2 are slidably attached to guide 114. In this arrangement, when forming device 140 applies a force F to portion P2 (as shown in FIG. 7), portion P2 slides within guide 114 away from portion P1 by a distance D. While track assembly 110 is extended in this manner, retraction lines 620 applies a contracting force (C) that draws an end 640 of portion P2 back towards an end 630 of portion P1.

Figure 8:
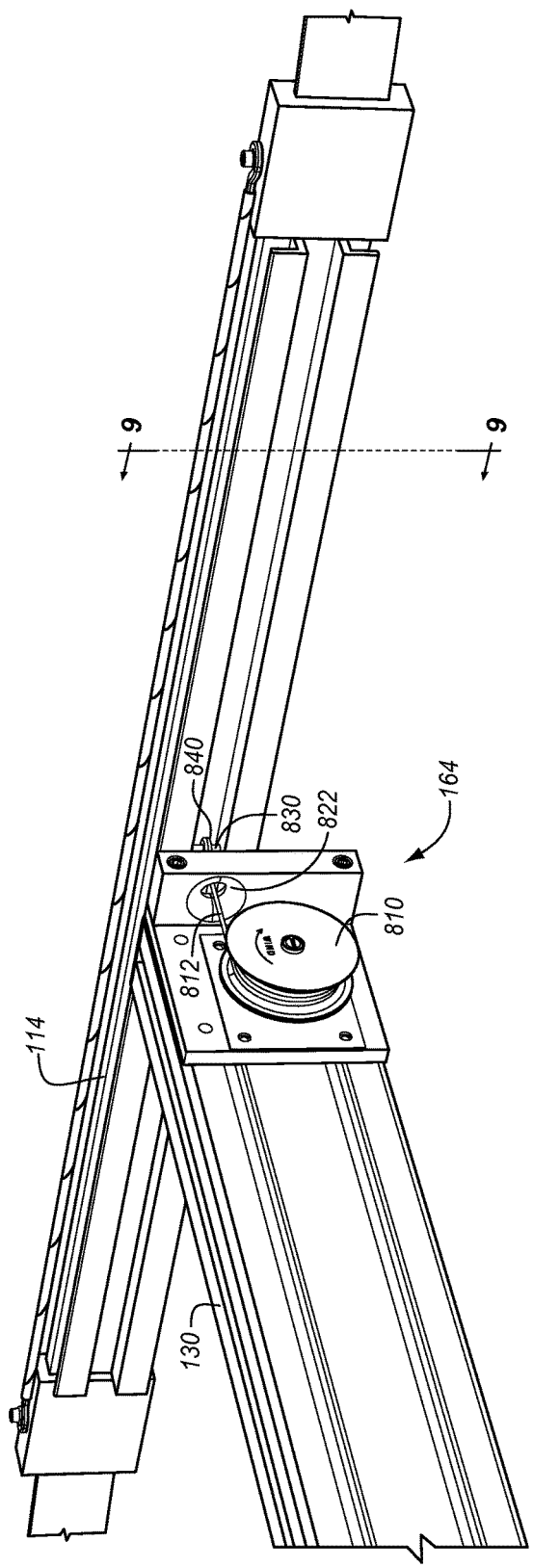
FIGS. 8-10 are diagrams illustrating deflection of a track assembly of a laminate delivery system in an exemplary embodiment.
Figure 9:
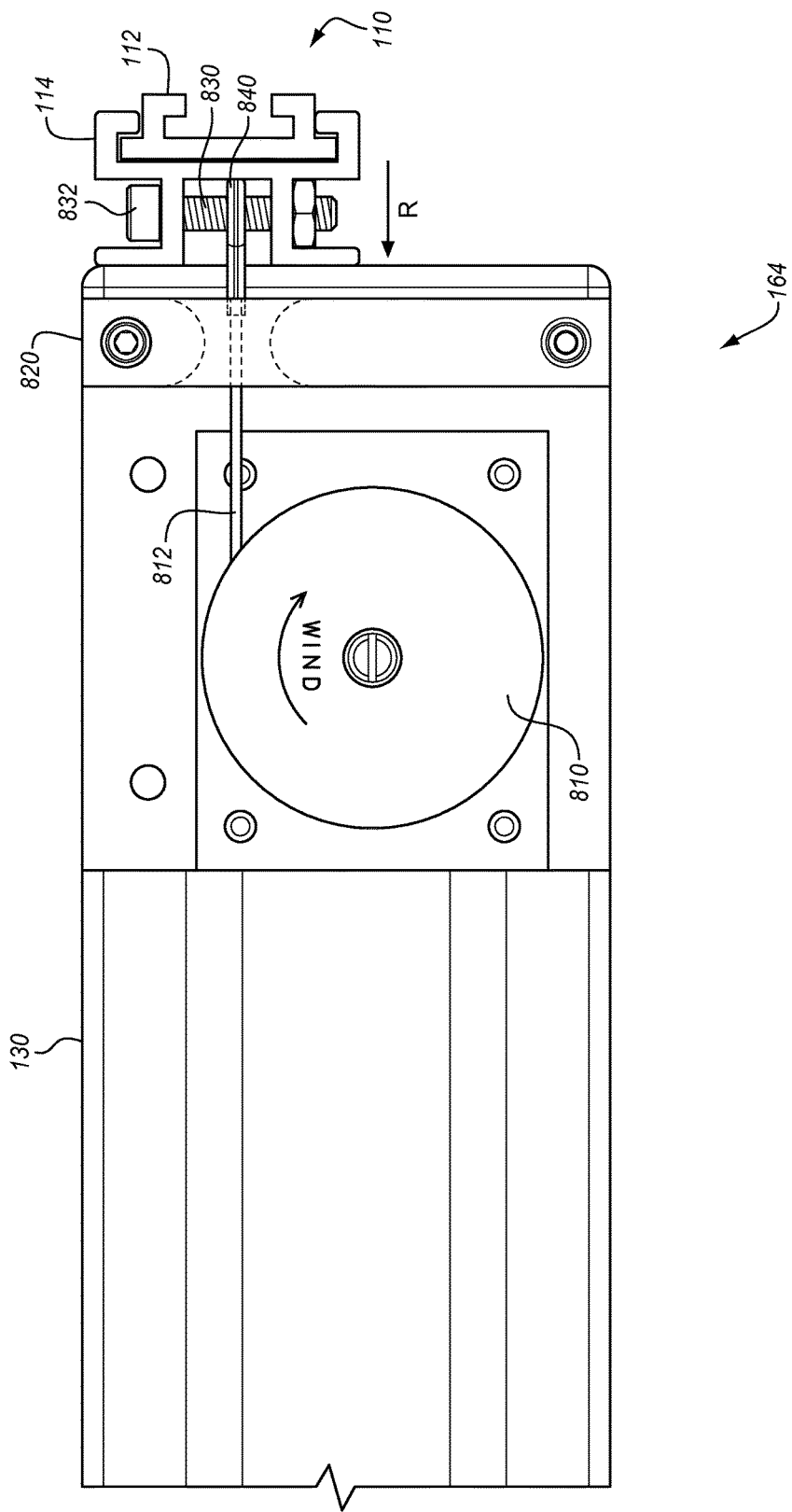
Figure 10:
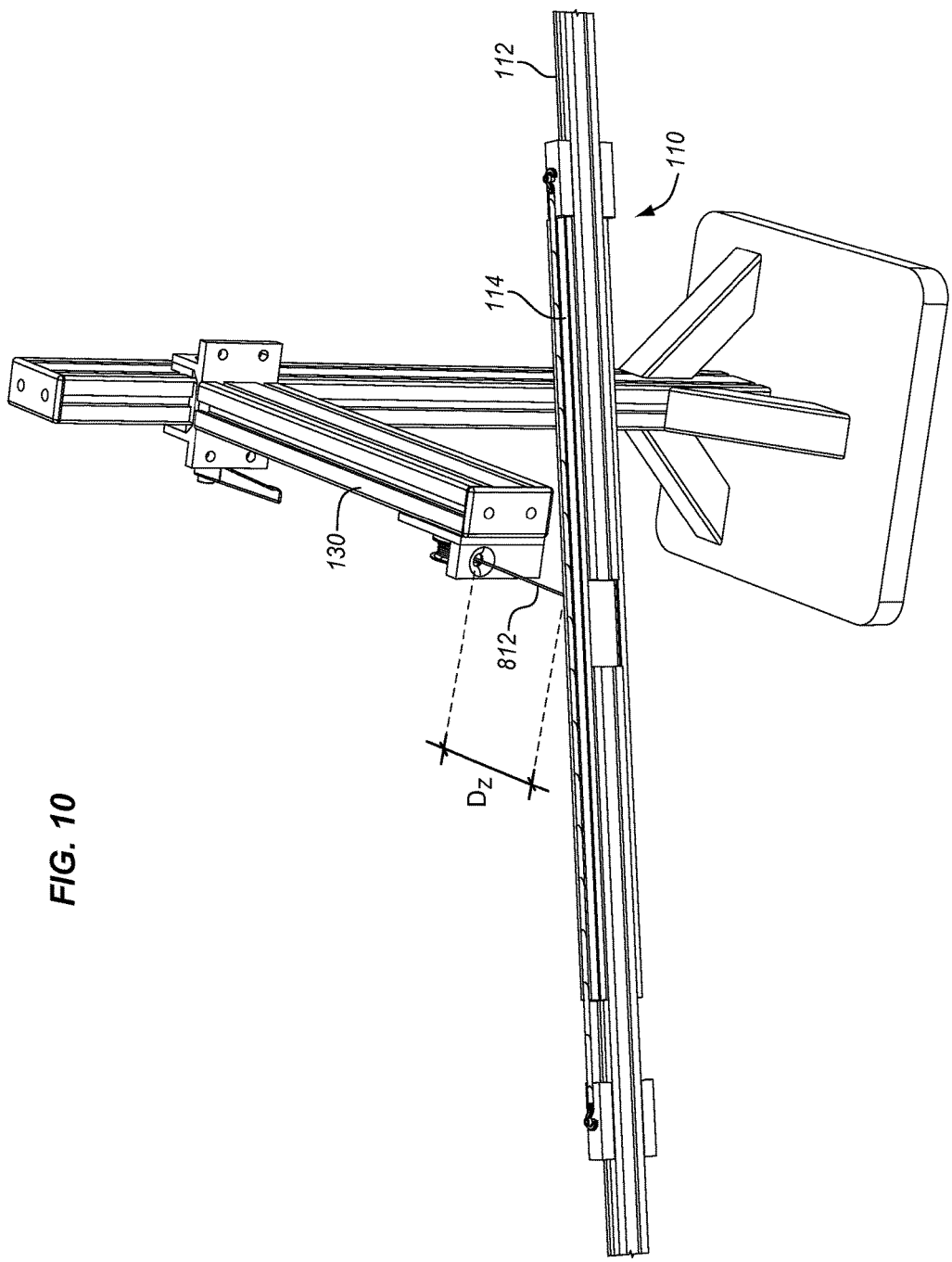

FIGS. 8-10 are diagrams illustrating deflection of a track assembly 110 of a laminate delivery system 100 in an exemplary embodiment. Specifically, FIG. 8 is a view indicated by view arrows 8 of FIG. 5. As shown in FIG. 8, retractor 164 includes spring-loaded cable reel 810, to which cable 812 (e.g., a metal cable) is fixedly attached. Thus, cable 812 is fixedly attached to support 130 via cable reel 810. Cable 812 travels through fairing hole 822 (i.e., an opening) of block 820 as cable 812 extends and retracts, and cable 812 is fixedly attached to guide 114 via fixation elements 830 and 840. In this embodiment, fairing hole 820 has a circular cross section, although in further embodiments fairing hole 820 may define a rectangular slot or other geometry. FIG. 9, indicated by view arrows 9 of FIG. 8, further illustrates fixation elements 830 (in this case, a bolt driven through guide 114 having a head 832), and 840 (in this case, a metal loop hooked around fixation element 830). When at rest, cable 812 applies a resting force R that holds/biases guide 114 towards contact with/proximate to support 130.

In FIG. 10, indicated by view arrows 6 of FIG. 5, during normal operations forming device 140 may apply a changing and dynamic force that overcomes the resting force provided by cable 812, which in turn results in guide 114 traveling a distance $D_z$. The distance may also include a vertical component $D_y$ (not shown) and/or a rotary component (also not shown). When forming device 140 completes operation, the resting force applied by cable 812 draws guide 114 back to support 130, ensuring that track assembly 110 returns to a desired default position (e.g., as shown in FIG. 8).

In further embodiments, retractor 162 of FIG. 6 may utilize a line that applies force via a spring-powered line/cable reel system similar to that used by retractor 164. Similarly, retractor 164 may utilize a cable that comprises an elastic cord similar to that shown for retractor 162.

Illustrative details of the operation of laminate delivery system 100 will be discussed with regard to FIG. 11. Assume, for this embodiment, that slider 200 has been placed into track assembly 110 as shown in FIG. 1. Further, assume that a user or automated mechanism has drawn slider 200 along track assembly 110 to an entrance of forming device 140. Forming device 140 utilizes mating features 240 as an indexing mechanism to ensure that laminate 220 is accurately formed, and is about to start forming operations to laminate 220 that will in turn apply forces that deflect and/or extend track assembly 110.

Figure 11:
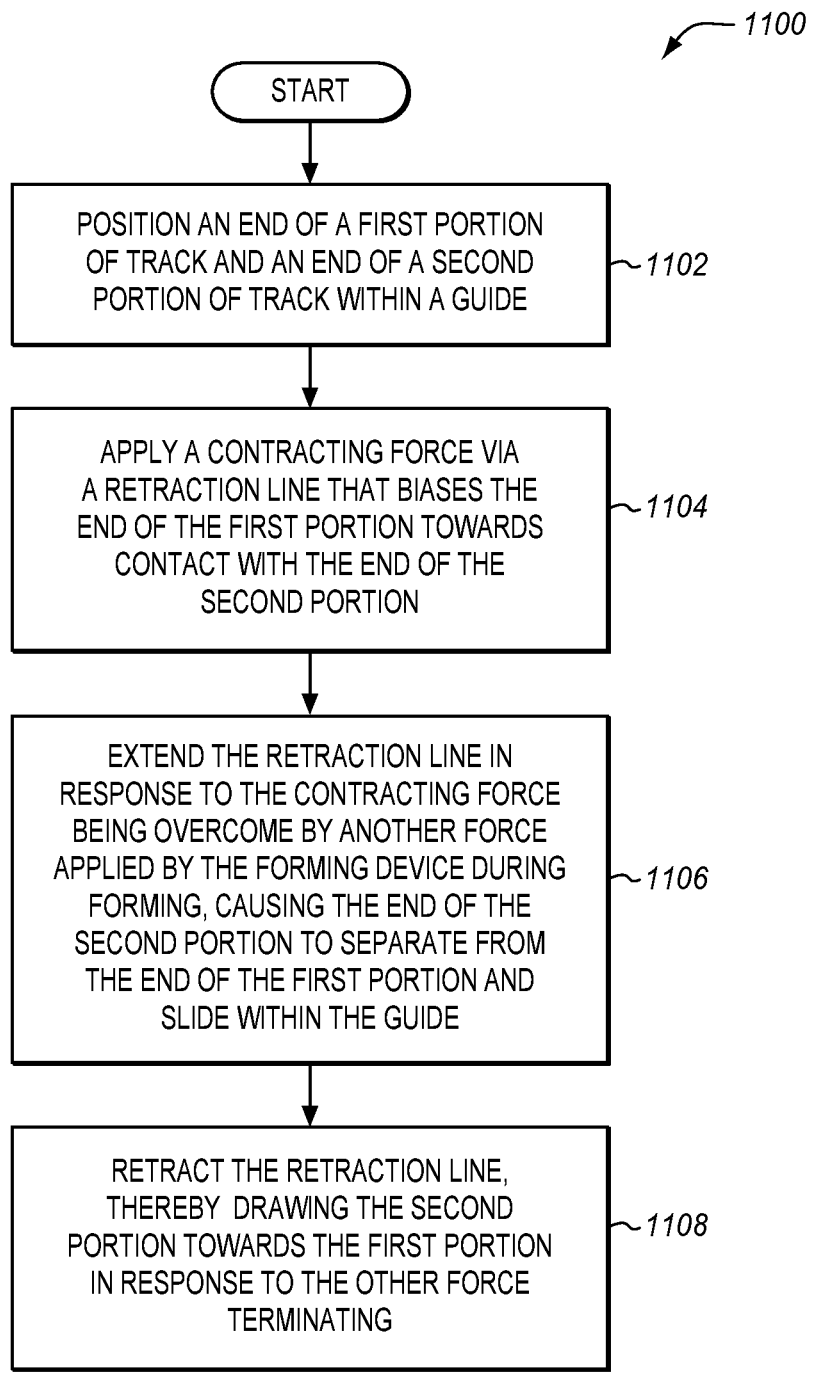
FIG. 11 is a flowchart illustrating a method for utilizing a track assembly of a laminate delivery system in an exemplary embodiment.

FIG. 11 is a flowchart illustrating a method 1100 for utilizing track assembly 110 of laminate delivery system 100 in an exemplary embodiment. The steps of method 1100 are described with reference to laminate delivery system 100 of FIG. 1, but those skilled in the art will appreciate that method 1100 may be performed in other systems. The steps of the flowcharts described herein are not all inclusive and may include other steps not shown. The steps described herein may also be performed in an alternative order.

Before slider 200 has reached support 130, retractors 162 and 164 position/hold end 630 of portion P1 of track 112, and end 640 of portion P2 of track 112, within guide 114 at a location that is proximate to support 130 (step 1102). Retractor 162 applies a contracting force via retraction line 620 that biases the end of portion P1 towards contact with the end of portion P2 (step 1104), and retractor 164 supplies a resting force to draw guide 114 proximate to support 130. Thus, at this point in time, track assembly 110 is in a resting position that enables slider 200 to slide into forming device 140.

Slider 200 may slide across portions P1 and P2 of track assembly 110 in order to deliver laminate 220 to forming device 140. After slider 200 has entered forming device 140, forming device 140 may then begin operations. This applies a dynamic and changing force (e.g., an unpredictable force) to track assembly 110 that may vary over time, drawing track assembly 110 in a variety of directions at a variety of magnitudes of force. As the operations of forming device 140 continue, retraction line 620 extends in response to the contracting force being overcome by another force applied by forming device 140 during forming. This in turn causes end 640 of portion P2 to separate from end 630 of portion P1, making portion P2 slide within guide 114 as illustrated in FIG. 7 (step 1106). Depending on the orientation of the force applied by forming device 140, this may also overcome a resting force applied by cable 812 to guide 114, resulting in guide 114 displacing/deflecting from support 130. Eventually, the amount of force applied by forming device 140 will terminate or otherwise be overcome by the resting and contracting forces. Thus, retraction line 620 contracts, drawing portion P2 of track 112 towards portion P1 in response to the force applied by forming device 140 terminating (step 1108).

Utilizing the methods and techniques described herein, sliders 200 moving across a track assembly 110 may be fully supported during their travels. Furthermore, the exact position of a portion of track assembly 110 may be altered in a varying manner (e.g., in order to respond to forces applied by forming device 140 as forming device 140 creates different shapes) without damaging track assembly 110. This provides a substantial benefit because it prevents forming device 140 from damaging track assembly 110. Furthermore, in environments where the motion of individual sliders is not automatic but rather is manually performed by an operator, the systems described herein ensure that the operator is not required to utilize a substantial amount of force in order to adjust the position of track assembly 110 as desired to ensure that laminates are properly loaded into forming device 140 (e.g., in order to pull a slider 200 into forming device 140, or to perform any other suitable task).

EXAMPLES

In the following examples, additional processes, systems, and methods are described in the context of a laminate delivery system.

Figure 12:
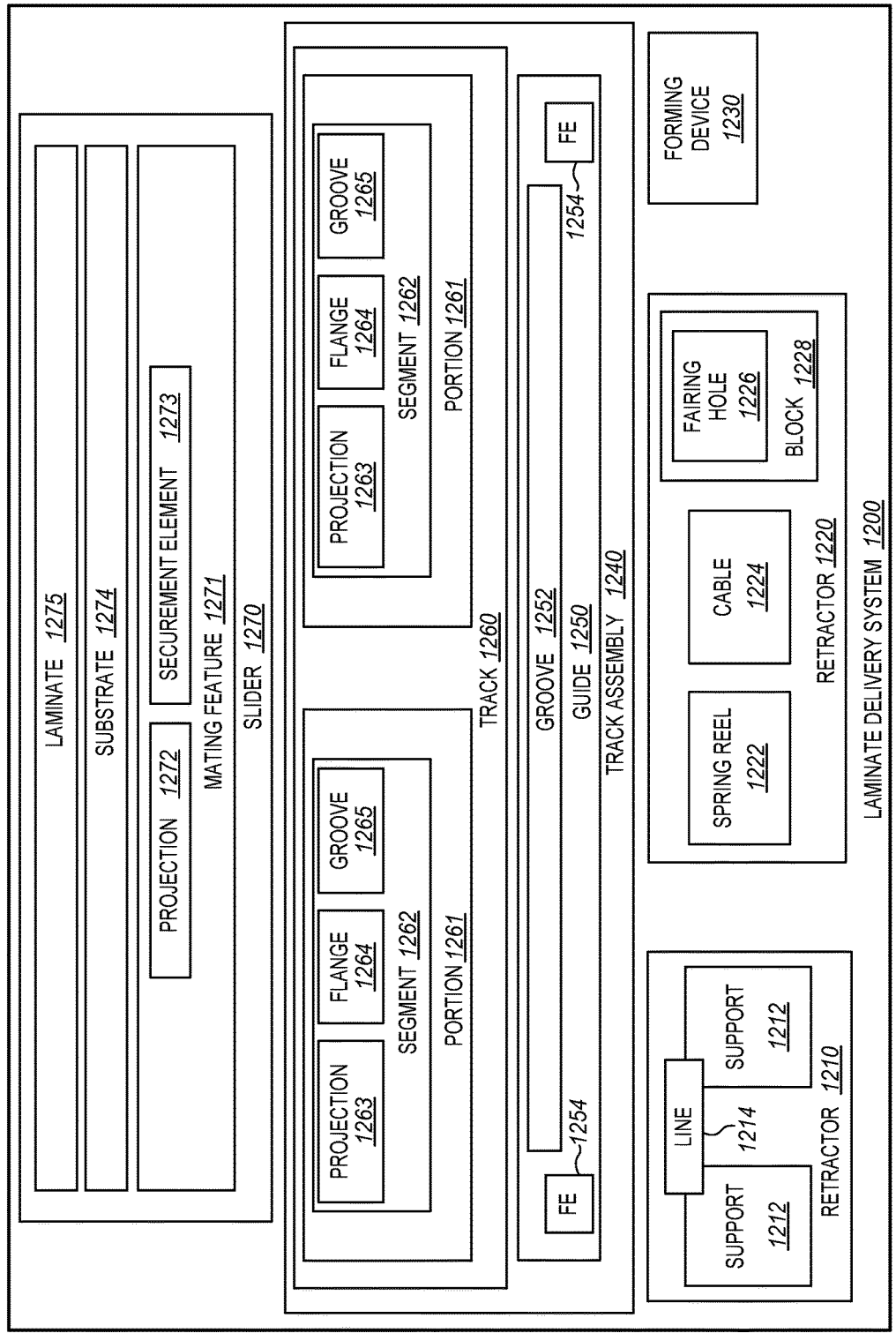
FIG. 12 is a block diagram of a laminate delivery system in an exemplary embodiment.

FIG. 12 is a block diagram of a laminate delivery system 1200 in an exemplary embodiment. In this example, system 1200 includes retractor 1210, retractor 1220, and forming device 1230. Retractor 1210 includes supports 1212, to which retraction line 1214 is attached. Retractor 1210 controls for extension of track assembly 1240. Meanwhile, retractor 1220 includes spring reel 1222, which applies a resting force to cable 1224. Cable 1224 travels through fairing hole 1226 of block 1228, and attaches to guide 1250 of track assembly 1240. Retractor 1220 compensates for deflection of track assembly 1240.

Track assembly 1240 includes guide 1250, which includes groove 1252 for accepting segments 1262 of track 1260. Guide 1250 further includes fixation elements 1254, which may be utilized to fix segments 1262 of track with respect to guide 1250. Track 1260 includes portions 1261 (e.g., portions which are fixedly attached to, or slidably disposed within, guide 1250). Each portion 1261 includes one or more segments 1262. Each segment 1262 includes one or more projections 1263 and flanges 1264 that together define a groove 1265 for receiving slider 1270. Slider 1270 includes multiple mating features 1271, which each include a projection 1272 and securement element 1273. Substrate 1274 is attached to one or more mating features 1271, and laminate 1275 is attached to substrate 1274. Laminate 1275 may be delivered to forming device 1230 by moving slider 1270 along track 1260.

Figure 13:
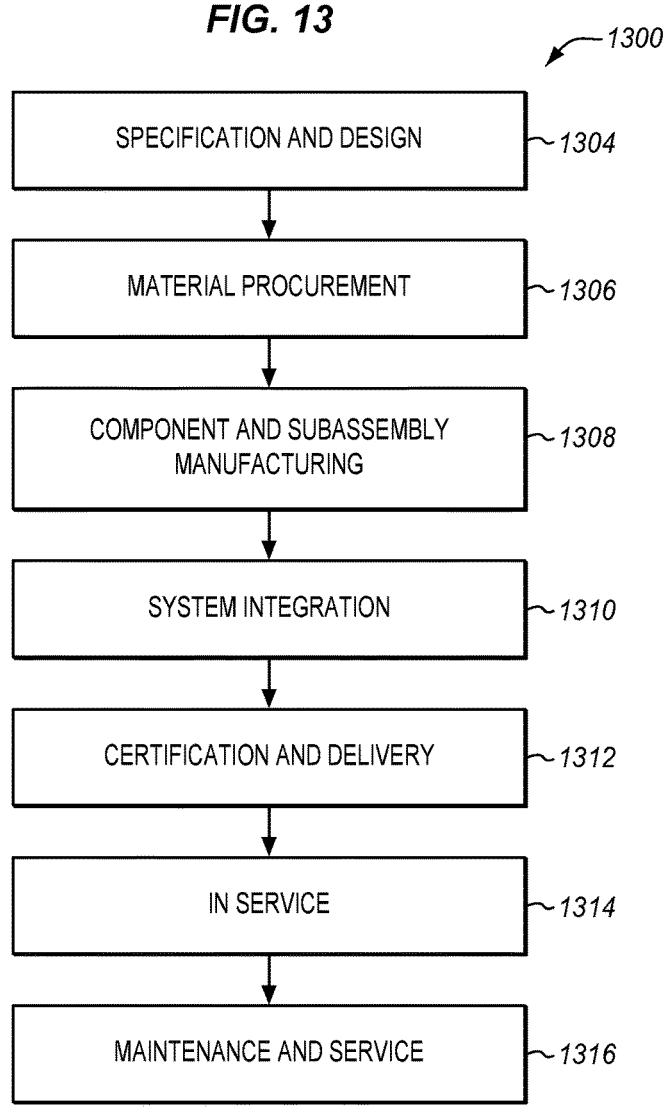
FIG. 13 is a flow diagram of aircraft production and service methodology in an exemplary embodiment.
Figure 14:
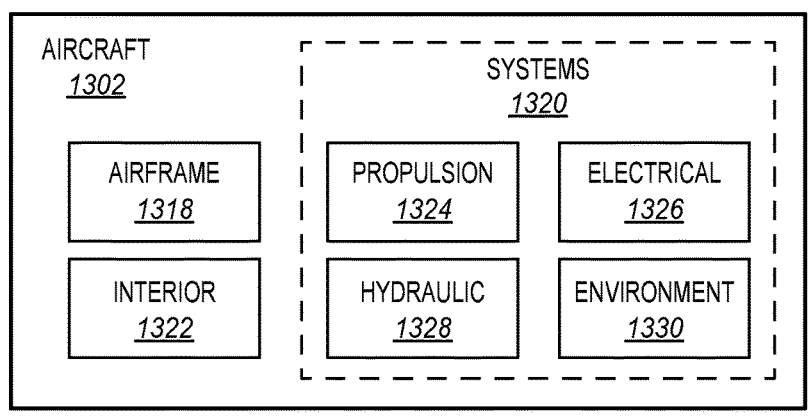
FIG. 14 is a block diagram of an aircraft in an exemplary embodiment.

Referring more particularly to the drawings, embodiments of the disclosure may be described in the context of an aircraft manufacturing and service method 1300 as shown in FIG. 13 and an aircraft 1302 as shown in FIG. 14. During pre-production, exemplary method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine maintenance and service 1316 (which may also include modification, reconfiguration, refurbishment, and so on).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by exemplary method 1300 may include an airframe 1318 with a plurality of systems 1320 and an interior 1322. Examples of high-level systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

Apparatus and methods embodied herein may be employed during any one or more of the stages of the production and service method 1300. For example, components or subassemblies corresponding to production stage 1308 may be fabricated or manufactured in a manner similar to components or subassemblies produced while the aircraft 1302 is in service. Also, one or more apparatus embodiments, method embodiments, or a combination thereof may be utilized during the production stages 1308 and 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation, to maintenance and service 1316. For example, the techniques and systems described herein may be used for steps 1306, 1308, 1310, 1314, and/or 1316, and/or may be used for airframe 1318 and/or interior 1322. These techniques and systems may even be utilized for systems 1320, including for example propulsion 13 24, electrical 1326, hydraulic 1328, and/or environmental 1330.

In one embodiment, laminate delivery system 100 is utilized to fabricate composite parts that comprise a portion of airframe 118, which are manufactured during component and subassembly manufacturing 1108. These composite parts may then be assembled into an aircraft in system integration 1110, and then be utilized in service 1114 until wear renders a composite part unusable. Then, in maintenance and service 1116, a composite part may be replaced with a newly manufactured composite part. Retractors 162 and/or 164 may be utilized throughout the process to ensure that laminates are formed for these new composite parts in a manner that is both efficient and reliable.

Although specific embodiments are described herein, the scope of the disclosure is not limited to those specific embodiments. The scope of the disclosure is defined by the following claims and any equivalents thereof.

The invention claimed is:

1. A system for conveying plies of laminate to a forming device, the system comprising:

a flexible track assembly comprising a first portion of track and a second portion of track, each of the portions defining a groove dimensioned to receive a slider that transports a ply, the second portion arranged to transport the ply into the forming device, the track assembly further comprising a guide in which an end of the first portion and an end of the second portion are disposed; and a retraction line that applies a contracting force that biases the end of the second portion towards contact with the end of the first portion, the retraction line being extendable to enable the second portion to separate from the first portion by sliding within the guide, thereby accommodating extension of the track assembly in response to forces applied by the forming device during forming.

2. The system of claim 1 further comprising:

a first support that is fixedly attached to the first portion and holds the track assembly in position;

a second support; and a cable that is fixedly attached to the second support and is fixedly attached to the guide, the cable applies a resting force that biases the guide towards the second support, the cable extends in response to the resting force being overcome by another force applied by the forming device during forming, causing the guide to deflect away from the second support, and the cable retracts the guide to the second support in response to the other force applied by the forming device terminating.

3. The system of claim 2 further comprising:

a spring-loaded cable reel that is attached to the second support, and that applies the resting force to the cable.

4. The system of claim 3 wherein:

the cable comprises a metal cable.

5. The system of claim 3 further comprising:

a block between the cable reel and the guide that defines an opening through which the cable travels as the cable extends and retracts.

6. The system of claim 5 wherein:

the opening has a circular cross-section.

7. The system of claim 2 wherein:

the cable comprises an elastic cord.

8. The system of claim 2 wherein:

a segment of the first portion and a segment of the second portion are disposed within the guide, and the guide is fixedly attached to the cable.

9. The system of claim 8 wherein:

a segment of the first portion is fixedly attached to the guide, and a segment of the second portion is slidably disposed within the guide.

10. The system of claim 1 wherein:

the line comprises a first end that is fixedly attached to the first portion, and a second end that is fixedly attached to the second portion;

the contracting force holds the end of the second portion in contact with the end of the first portion, the line extends in response to the contracting force being overcome by another force applied by the forming device during forming, and the retraction line retracts the end of the second portion back into contact with the end of the first portion in response to the other force terminating.

11. The system of claim 1 further comprising:

a spring-loaded cable reel that is attached to the first portion, and that applies the contracting force to the line.

12. The system of claim 1 wherein:
the line comprises an elastic cord.

13. The system of claim 1 wherein:
the line dynamically retracts and extends in response to forces applied by the forming device during forming.

14. The system of claim 1 wherein:
a segment of the first portion is fixedly attached to the guide, and a segment of the second portion is slidably disposed within the guide, and
the retraction line is fixedly attached to the guide, and is fixedly attached to the segment of the second portion.

15. The system of claim 1 wherein:
the track assembly comprises a material that undergoes elastic deflection in response to forces applied by the forming device.

16. The system of claim 1 further comprising:
a slider comprising:
  securement elements dimensioned to slide within the groove;
  a flexible substrate fixedly attached to the securement elements; and
  a ply of composite material attached to the flexible substrate.

17. A method for controlling a position of a flexible track assembly that conveys plies of laminate to a forming device, the method comprising:
positioning an end of a first portion of track and an end of a second portion of track within a guide;
applying a contracting force via a retraction line that biases the end of the first portion towards contact with the end of the second portion;
extending the retraction line in response to the contracting force being overcome by another force applied by the forming device during forming, causing the end of the second portion to separate from the end of the first portion and slide within the guide; and
retracting the retraction line, thereby drawing the second portion towards the first portion in response to the other force terminating.

18. The method of claim 17 wherein:
extending the retraction line comprises elastically deforming the retraction line.

19. The method of claim 17 wherein:
extending the retraction line comprises drawing the retraction line from a spring-loaded cable reel.

20. The method of claim 17 further comprising:
applying, via a cable attached to the guide, a resting force that biases the guide towards a support attached to the cable;
extending the cable in response to the resting force being overcome by the other force, causing the guide to separate from the support; and
retracting the guide to the support in response to the other force terminating.

\* \* \* \* \*